W. H. Livingston,
Hand Saw.
N° 30,076.  Patented Sep. 18, 1860.
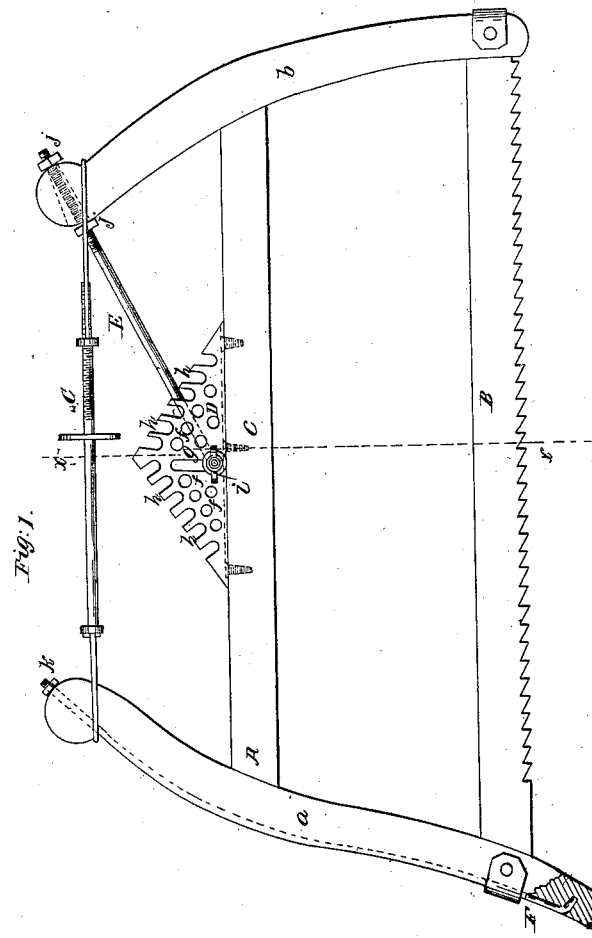

UNITED STATES PATENT OFFICE.

WM. H. LIVINGSTON, OF NEW YORK, N. Y.

WOOD-SAW FRAME.

Specification forming part of Letters Patent No. 30,076, dated September 18, 1860; Reissued April 14, 1863, No. 1,452.

*To all whom it may concern:*

Be it known that I, W. H. LIVINGSTON, of the city, county, and State of New York, have invented a new and useful improvement in hand-saws (No. 1), those which are strained in a frame—such, for instance, as bucksaws for sawing firewood and scroll-saws used by mechanics for sawing scrolls; and I do hereby declare that the following is a full, clear, and exact description of the same, reference being had to the annexed drawings, making a part of this specification, in which—

Figure 1 is a side view of my invention; Fig. 2 a section of the same taken in the line $x$, $x$, Fig. 1.

Similar letters of reference indicate corresponding parts in the two figures.

This invention consists in attaching a metal plate to the cross bar of the saw frame and connecting an adjustable brace to said metal plate and one of the end-pieces of the frame substantially as hereinafter fully shown and described, whereby the cross-bar of the frame is materially strengthened and prevented from bending in any direction and the brace rendered capable of being adjusted so that the saw may be perfectly strained by the movement of both end-pieces of the frame and the symmetry of the latter always preserved.

To enable those skilled in the art to fully understand and construct my invention I will proceed to describe it.

A, represents a saw-frame such as are commonly termed buck-saws, B the saw secured therein and properly strained by a screw rod C, applied to the upper parts of the end-pieces $a$, $b$, of the frame these parts are of usual construction and therefore do not require a minute description.

To the center of the cross-bar $c$, of the saw frame A, there is secured a metal plate D. This plate may be of tri-lateral form, having a lip or flanch $d$, at its lower end through which screws $e$, pass into the cross-bar $c$, and secure the plate thereto.

The plate D is perforated with holes $f$ and provided with a slot $g$ and has its upper edges notched as shown at $h$. In the slot $g$, in any of the holes $f$, or in any of the notches $h$, one end of a metal rod E, is fitted and secured by a thumb-nut $i$. The opposite end of the rod E, passes through a taper opening in the upper part of the end-piece $b$, of the frame and the rod has a screw thread cut on it and two jam-nuts $j$, $j$, placed on it one at each side of the end-piece as shown clearly in Fig. 1.

The rod E, serves to brace and strengthen the frame and the metal plate D, strengthens the cross bar $c$, preventing the same from bending or springing in any direction. Whenever the saw B, is strained the brace rod E, is detached at either end so as to admit of both end-pieces $a$, $b$, being moved and the saw strained at both ends. By this arrangement the symmetry of the frame is preserved and the frame properly balanced, the detached end of the brace rod being connected as soon as the saw is strained. The holes, slot and notches in the plate D, admit of the brace rod being attached to it at different points and thereby compensate for the varying position of the end-piece $b$, to which it is attached, for instance, if the upper part of the end-piece $b$, is drawn inward or toward $a$, under the action of the screw rod C, the inner end of the brace rod E, must be fitted in a hole $f$ or notch $h$, nearer $a$; or, the inner end of the brace rod must be depressed in the slot $g$; or, the jam-nuts $j$, $j$, may be adjusted at the upper and outer part of the brace rod E. This adjustment of the brace rod E, is important for if a rigid rod were used the saw B, would be necessarily strained by the movement of one end-piece $a$, the rod E, keeping the end-piece $b$, stationary hence the rod $a$, requires to be moved just double the distance that it would be were both end-pieces movable and consequently by the employment of a fixed brace rod the symmetry of the frame cannot be preserved.

I do not confine myself to any particular means for adjusting the inner end of rod E, in the plate D, for various plans may be used.

In the outer edge of the end-piece $a$ of the frame A, there is made a longitudinal groove in which a metal rod F, is fitted. This groove extends nearly the whole length of $a$, and the lower end of this rod F, is bent inward in hook-form as shown in Fig. 1, and the upper end passes through the upper end of the end-piece $a$, and has a screw nut $k$, on it. The rod F, is strained perfectly taut in the end-piece $a$, by screwing up the nut $k$, and said rod strengthens the end-piece preventing it from breaking while the saw is manipulated in the performance of its work. The end-piece $a$, is more liable to be broken than $b$, as the hands of the operator grasp the former; the end-piece $b$, however may be strengthened in a similar manner.

I do not claim separately the brace rod E for that has been previously used; but, I do claim as new and desire to secure by Letters Patent—

The combination of the brace rod E, and metal plate D, arranged or applied to the saw frame substantially as and for the purpose set forth.

WM. H. LIVINGSTON.

Witnesses:
M. M. LIVINGSTON,
JNO. H. SCOTT.